United States Patent
Manabe

(10) Patent No.: US 7,548,623 B2
(45) Date of Patent: Jun. 16, 2009

(54) COMMUNICATION SYSTEM, COMMUNICATION DEVICE, AND COMMUNICATION METHOD

(75) Inventor: Masao Manabe, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 827 days.

(21) Appl. No.: 11/113,975

(22) Filed: Apr. 26, 2005

(65) Prior Publication Data
US 2005/0239439 A1 Oct. 27, 2005

(30) Foreign Application Priority Data
Apr. 27, 2004 (JP) ............... 2004-131324

(51) Int. Cl.
*H04L 9/00* (2006.01)
(52) U.S. Cl. ..................... 380/283; 380/278
(58) Field of Classification Search .......... 380/283
See application file for complete search history.

(56) References Cited

U.S. PATENT DOCUMENTS

2004/0006705 A1* 1/2004 Walker ............. 713/200

2005/0135628 A1* 6/2005 Dacosta ............. 380/283

FOREIGN PATENT DOCUMENTS

| JP | 9-114719 | 5/1997 |
| JP | 2003-283481 | 10/2003 |
| TW | 490966 B | 6/2002 |

OTHER PUBLICATIONS

D. Patiyoot et al., WASS: A Security Services for Wireless ATM Networks, Vehicular Technology Conference, 1999. VTC 1999—Fall. IEEE VTS 50th Amsterdam, Netherlands Sep. 19-22, 1999, Piscataway, NJ, USA, IEEE, Sep. 19, 1999, pp. 3034-3038.*
Taiwanese Office Action dated Nov. 11, 2008 with Partial English-Language Translation.

* cited by examiner

Primary Examiner—Jung Kim
(74) Attorney, Agent, or Firm—McGinn IP Law Group, PLLC

(57) ABSTRACT

One and the other communication terminals for performing wireless communication are connected by a cable. The one communication terminal performs control so that an encryption key is transmitted from the one communication terminal to the other communication terminal by wireless during a period in which the potential of the cable is active. The other communication terminal stores the encryption key received from the one communication terminal within the period in which the potential of the cable is active, as a valid key, for use in subsequent encryption processing.

23 Claims, 5 Drawing Sheets

CERTIFICATE AUTHORITY MODEL

WHEN USB FLASH KEY IS USED

COMMUNICATION SYSTEM, COMMUNICATION DEVICE, AND COMMUNICATION METHOD

FIELD OF THE INVENTION

The present invention relates to a communication system. More specifically, the invention relates to a system, a device, and a method suitable for being applied to key distribution and the like between devices that perform wireless communication.

BACKGROUND OF THE INVENTION

In communication systems, in order to perform secure transmission and reception of information, various encryption methods have hitherto been employed. In a public key encryption system that uses two keys of a public key and a private key which become a pair, a property that information encrypted by one key (such as the public key) can be decoded only by the other key (private key) is used. The secure transmission of information to a communication party connected via a network is thereby enabled. When information is transmitted in accordance with the public key encryption system, the pair of the private key and the public key is generated by the receiver of the information, for example. The private key is held by the receiver, and the generated public key is open to the public on the network. The transmitter of the information obtains the public key, encrypts the information (plaintext) using the public key, and transmits the cipher text to the receiver. The receiver decodes the received cipher text using the private key held by the receiver. In the public key encryption system, much more computation is required than in a common key encryption system. Thus, when encryption is performed on a message for transmission, a method is used in which a common key is safely transmitted using the public key encryption system, and then the message is encrypted using the transmitted common key. In the common key encryption system, the common key is generated by a transmission side, the generated common key is safely transmitted to a receiving side, and information (plaintext) is encrypted by the generated key, for transmission. The receiving side receives the encrypted information and decodes the information (plaintext) by the common key safely received in advance. When the same key is used for a long time, the encryption is easy to be broken. Thus, the periodical change of the key is performed. In this case, too, the public key encryption system is used for delivery (change) of the common key.

As described above, when communication is performed using the public key encryption system, the public key is transmitted to a communication party. Since the communication party is not seen in the communication via the network, a third party may disguise himself as the communication party and may transmit the public key. For this reason, when the public key encryption system is used, it is necessary to confirm that the public key to be used is truly the one of a correct party. As one approach to authenticating the owner of the public key, there is a method (referred to as a "certificate authority model") where a certificate authority, which is a reliable third party organization, certifies that the owner of the public key is authentic. From the certificate authority, a certificate that certifies the public key and the owner thereof is issued, and the signature (digital signature) of the certificate authority is appended to the certificate. Incidentally, as a public key infrastructure (PKI), the certificate authority, a registration authority, a repository and the like are included. Then, the owner of the certificate to whom the certificate is issued from the certificate authority, and who performs decoding of the digital signature and the cipher text using the private key corresponding to the public key and the user of the certificate who obtains the certificate of the certificate owner and performs verification of the digital signature and encryption of a document are included.

By the way, wireless communication is easy to be eavesdropped (intercepted). That is, in the wireless communication, which is different from wired communication, anyone is given an opportunity to enable interception. In the wireless communication that does not have the physical limitation of being equipped with a communication cable or the like, in particular, authentication of the owner of the public key (measures against disguising by a third party), for example, becomes an extremely important challenge. Assume that a certain wireless terminal (A) erroneously determines the public key of the wireless terminal (C) of the third party that disguised it as a wireless terminal (B), which is an original communication party, as the public key of the wireless terminal (B). Then, a message encrypted by the wireless terminal (A) using the public key from the wireless terminal (C) would be decoded by the wireless terminal (C) rather than the wireless terminal (B). That is, in the public key encryption system, whether the received public key is an authorized or unauthorized one cannot be determined by the terminal of the receiving side. Thus, there is a problem that the terminal is vulnerable to a spoofing attack.

As one of the measures against preventing the spoofing by the third party in delivery of the public key, the certificate authority model is used. However, it becomes necessary for the certificate authority model to include communication means such as the Internet. It becomes necessary to install and manage the certificate authority and the registration authority that issues key information (an authentication certificate) and perform registration. That is, when the certificate authority model is used, connection to the Internet is preconditioned. In a LAN for personal computers, the certificate authority model that preconditions logging in and network connection can also be used. However, in a system in which terminals perform mutual communication using an interface such as a wireless USB (Universal Serial Bus) and the connection to the Internet is not assumed, or the like, the certificate authority model cannot be used. Then, because of the high cost of the certificate authority model, the actual situation is that the certificate authority model is actually used by enterprises alone.

If the certificate authority model is assumed to be applied to a wireless terminal, it becomes necessary for the wireless terminal to include an electronic certificate decoding circuit 61 as shown in FIG. 6, which shows a comparative example, in addition to the Internet connection function. The circuit size and the cost will therefore increase. The electronic certificate decoding circuit 61 determines whether the certificate transmitted from the communication party is authentic. When the certificate is authentic, the electronic certificate decoding circuit 61 supplies the public key received through an antenna 63 to an encryption circuit 62 as the valid key.

As a configuration for delivering the key information using means other than the wireless communication, there is also known the configuration in which a cipher is exchanged by magnetic media or the like, for example (refer to Patent Document 1 which will be described hereinafter). According to this Patent Document 1, at the time of exchanging business cards, a magnetic recording business card with the public key of a party for performing encrypted electronic mail communication recorded thereon is obtained. Then, the recorded public key is read by a magnetic information reading device, and an encryption key for encrypting an electronic mail is generated by an encryption key generating unit. Then, the encryption key is encrypted by the public key, and the encrypted encryption key and the encrypted electronic mail are transmitted. A receiver then decodes the encrypted encryption key using the private key, and decodes the encrypted electronic mail using the encryption key. Alternatively, there is also known an approach in which, by transmitting the encryption key using one of the wireless communication, transmission power of which have been reduced more than in a wireless LAN, weak radio communication, infrared rays, optical communication, and power line communication, the encryption key is transmitted. Then, it is so arranged that encryption key information is not leaked outside a room for performing the wireless communication, thereby improving security (refer to Patent Document 2 that will be described hereinafter). Further, a configuration for delivering the encryption key by the wired communication such as the USB, IEEE 1394, or the like can also be conceived.

In such configurations described above, however, a magnetic recording medium, an interface for reading out a recording medium, or an interface for cable connection such as the USB, IEEE 1394, or the like needs to be additionally provided for delivery of the encryption key, in addition to means for the wireless communication. When wireless terminals are to exchange the encryption key using a USB flash key, for example, each of the wireless terminals needs a USB interface 71, as shown in FIG. 7 which shows a comparative example. An encryption circuit 72 for the wireless terminal obtains the key information from the USB interface 71.

Further, as described in Patent Document 2, when the configuration using a feeble radio wave is employed, control is not easy. In addition, it is also difficult to determine the level of such feebleness as cannot be eavesdropped.

Further, as another method of delivering the key information, there is also an approach in which the key information for each terminal is manually set by a user. However, manual input of the key information using inputting means is time-consuming and inconvenient. An inputting error may also occur. Further, as the length of the key is increased, the probability of occurrence of the error (erroneous input) increases. Further, depending on the device, there is also the device that lacks the inputting means by which the key information is manually input.

[Patent Document 1]

JP Patent Kokai Publication No. JP-A-9-114719 (pp. 3-4, FIG. 2)

[Patent Document 2]

JP Patent Kokai Publication No. JP-P2003-283481A (p. 3, FIG. 1)

SUMMARY OF THE DISCLOSURE

As described above, the certificate authority model as the measure against disguising by the third party, preconditions the connection to the Internet. Thus, the certificate authority model cannot be applied to a device not equipped with the function of being connected to the Internet.

Further, as the certificate authority model is applied to the wireless terminal equipped with the function of being connected to the Internet, the circuit size will be increased, as shown in FIG. 6, thus leading to an increase in power consumption and a high cost.

Next, when the interface such as the magnetic recording medium, USB, IEEE 1394, or an electric light line is employed in a device for performing the wireless communication, an interface dedicated to those will additionally become necessary, thus leading to the high cost.

Then, when the user performs manual inputting using the inputting means, erroneous input may also occur. Further, depending on the device, there is also the device that lacks the inputting means.

The invention disclosed in the present application has the general configuration described below.

A system according to one aspect of the present invention includes at least two communication devices for performing wireless communication. One communication device of the two communication devices includes a circuit for performing control so that a signal indicating that predetermined information is valid is transmitted to the other communication device when the predetermined information is transmitted from the one communication device to the other communication device by wireless. The other communication device includes a circuit for determining whether the received information is valid or not based on the signal indicating that the information is valid upon receipt of the information transmitted from the one communication device by wireless.

In the system according to the present invention, the one communication device transmits the signal indicating that the information is valid to the other communication device in the form of an electric signal.

In the system according to the present invention, the signal indicating that the information is valid may be configured to be set to be active during a time range including a period during which the information sent from the one communication device by wireless is transmitted to the other communication device.

In the system according to the present invention, the one communication device may be configured to include a circuit for generating a timing signal as the signal indicating that the information is valid and transmitting the timing signal to the other communication device, the timing signal being for making discrimination between a timing of starting the transmission of the information by wireless and a timing of finishing the transmission of the information by wireless.

In the system according to the present invention, the one communication device may be configured to include a circuit for generating a timing signal as the signal indicating that the information is valid and transmitting the timing signal to the other communication device, the timing signal being for making discrimination between a timing of starting the transmission of the information by wireless and a timing of finishing the transmission of the information by wireless.

In the system according to the present invention, the other communication device may be configured to include:

a receiving circuit for receiving the information transmitted by wireless from the one communication device; and a circuit for receiving the timing signal transmitted from the one communication device.

Then, the receiving circuit may be configured to determine whether the information transmitted from the one communication device by wireless is valid or not according to whether the receiving circuit has received the information transmitted by wireless from the one communication device at a time between the timing of starting the transmission and the timing of finishing the transmission indicated by the received timing signal.

In the system according to the present invention, the signal indicating that the information is valid may be configured to be transmitted from the one communication device to the other communication device through a cable detachably connecting one terminal of the one communication device and one terminal of the other communication device.

A method according to another aspect of the present invention includes the steps of:

transmitting by one communication device of at least two communication devices for performing wireless communication a signal indicating that predetermined information is valid to the other communication device when transmitting the predetermined information from the one communication device to the other communication device by wireless; and determining whether the received information is valid or not based on the signal indicating that the information is valid upon receipt of the information transmitted from the one communication device by wireless, by the other communication device.

A method according to a still other aspect of the present invention includes the steps of:

establishing connection between one communication terminal and the other communication terminal by a cable; setting a potential of the cable to an active state from an inactive state when transmitting an encryption key to the other communication device by wireless, and setting the potential of the cable to the inactive state after completion of the wireless transmission of the encryption key, by the one communication device; and determining the encryption key received from the one communication device within a period during which the potential of the cable is in the active state to be a valid encryption key, and storing the encryption key in a storage unit of the other communication device, by the other communication device.

In the method according to the present invention, the potential of the cable is set to the inactive state except while the encryption key is delivered.

A device according to other aspect of the present invention includes:

an antenna;

one control terminal connected to one control terminal of a device of a communication party through an electrical connecting member;

a circuit for delivering an encryption key by wireless to the device of the communication party through the antenna; and a circuit for setting a potential at the control terminal to an active state while delivering the encryption key to the device of the communication party by wireless and then setting the potential at the control terminal to an inactive state after delivering the encryption key to the device of the communication party by wireless.

A device according to another aspect of the present invention includes:

an antenna;

one control terminal for receiving a control signal;

a circuit for decoding an encryption key transmitted from the device of the communication party by wireless and received through the antenna; and a circuit for determining whether the received encryption key has been received in a period during which the potential at the control terminal is an active state and performing control so that the received encryption key is stored in a holding circuit thereof as a valid encryption key when the encryption key is determined to have been received in the period during which the potential at the control terminal is in the active state.

The meritorious effects of the present invention are summarized as follows.

According to the present invention, by establishing electric connection between the communication devices by a cable or the like, for example, supplying a signal at a predetermined level from the communication device on a receiving side to the communication device on a transmission side through the cable, and delivering key information from the communication device on the transmission side to the communication device on the receiving side by wireless, simple and safe delivery of the key is implemented.

Still other effects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Figure 1:
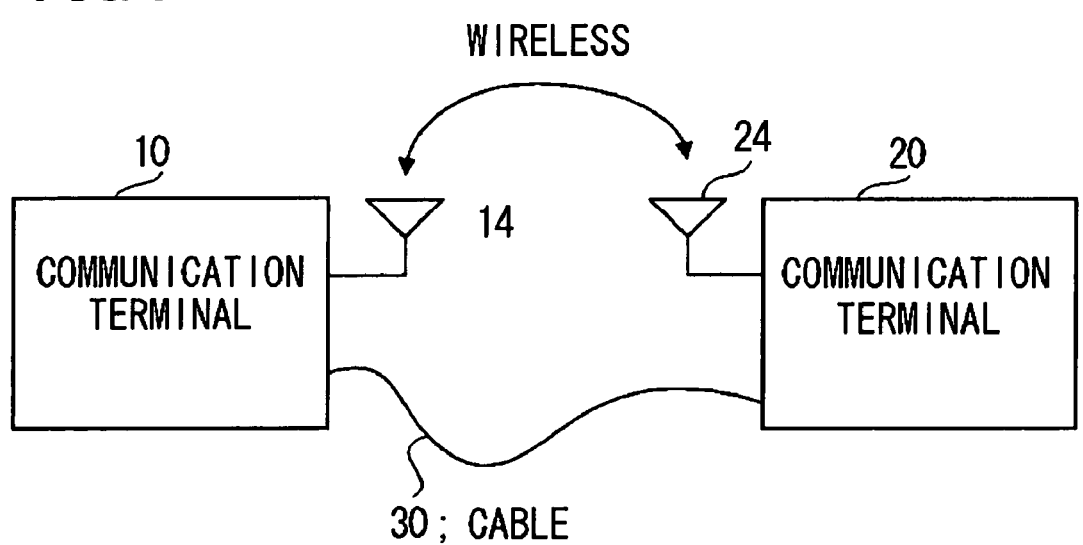
FIG. 1 is a diagram showing a system configuration of an embodiment of the present invention.

Preferred embodiments of the present invention will be described. FIG. 1 is a diagram showing a configuration of an embodiment of the present invention. Referring to FIG. 1, in a communication system according to the embodiment of the present invention, a communication terminal 10 and a communication terminal 20 which perform communication by wireless are connected by a cable 30. Then, while key information is delivered, the potential of the cable 30 is set to an active state. The potential of the cable 30 is set to an inactive state except while the key information is delivered. When the communication terminal (such as the communication terminal 10) for delivering a key transmits the key information by wireless communication, the communication terminal sets the potential of the cable 30 to an active state.

In the present embodiment, the communication terminal (such as the communication terminal 20) to which the key information is delivered by wireless communication regards the key information while the potential of the cable 30 is active as being valid, and receives the key information. When the delivery of the key information is finished, the communication terminal (such as the communication terminal 10) for delivering the key information sets the potential of the cable 30 to an inactive state.

In the present embodiment, the validness of the key information is determined based on a system in which the potential of the cable 30 is set in an active state only during the period of the delivery of the key. Since it should be so arranged that a change of the potential of the cable 30 to an active state/inactive state can only be detected, configuration can be made by a simple circuit. In the embodiment, a complicated protocol or interface such as the USB or IEEE 1394 is not needed for delivery of the key information.

Compared with the case in which the interface such as the USB or IEEE 1394 is employed, in the present embodiment, the unit prices of the cable and a connector, and the packaging price of a device can be reduced to a particularly low price.

Further, in the present embodiment, no certificate authority is needed, so that connection to the Internet is not preconditioned, either.

In the present embodiment, after connection by the cable, delivery of the key information, setting the potential of the cable, and the like are automatically performed by the communication terminals, so that manual setting is not required.

Further, in the present embodiment, it is difficult for a third party to guess a timing of the operation of the cable connection between the communication terminals. Thus, it becomes difficult for the third party to disguise the key, for delivery.

In the present embodiment, with respect to an attack method of delivering the key information at random, there may be included a function of making determination of being attacked when the number of the delivery of the key at an erroneous timing has exceeded a predetermined threshold value.

Figure 5:
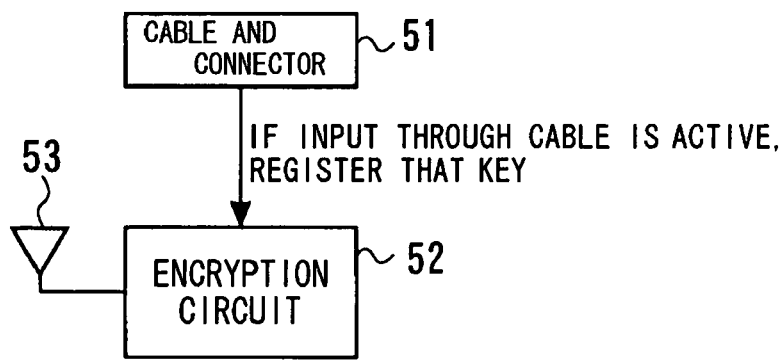
FIG. 5 is a diagram schematically showing a configuration of a device according to the embodiment of the present invention.
Figure 6:
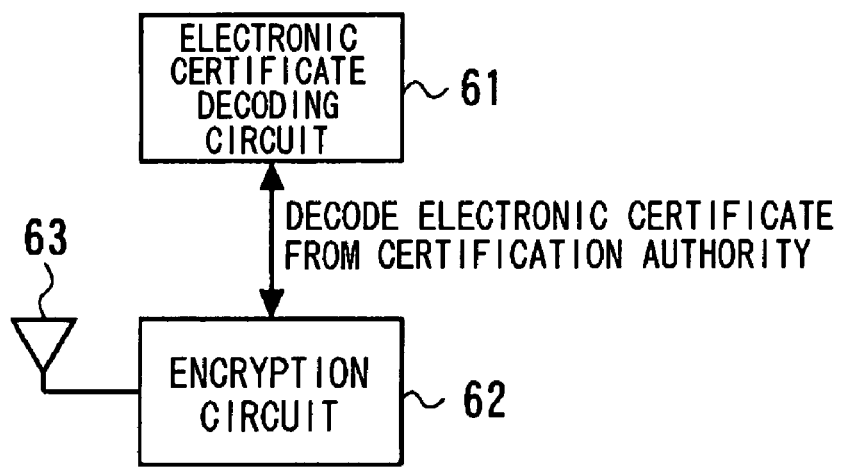
FIG. 6 is a diagram schematically showing a configuration of a device that uses a CA (Certificate Authority) model (comparative example)
Figure 7:
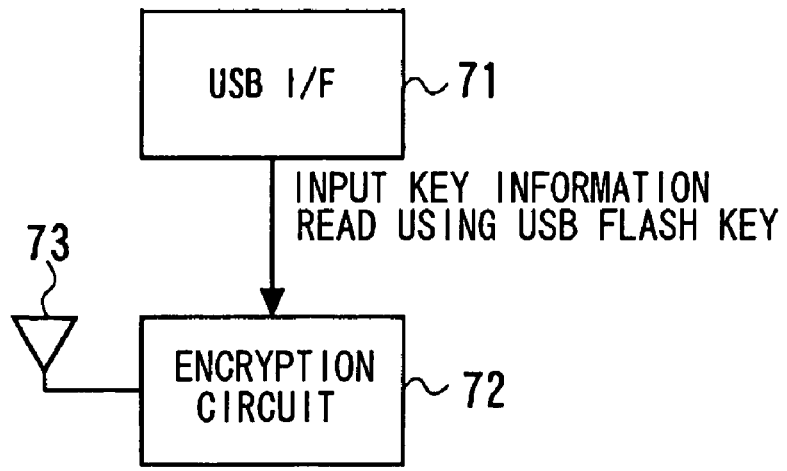
FIG. 7 is a diagram schematically showing a configuration of a device that uses an USB interface (comparative example).

FIG. 5 is a diagram for comparing the configuration of the embodiment of the present invention with configurations shown in FIGS. 6 and 7. As shown in FIG. 5, the communication terminal according to the present embodiment is configured to include a cable 51 (the cable and the connector), an encryption circuit 52, and an antenna 53 (wireless unit) for performing wireless communication. Complicated circuit configurations as shown in FIGS. 6 and 7, which show comparative examples, are not thereby needed. That is, the present invention can implement a measure against a spoofing attack, prevention of which was made to be difficult during the wireless communication, simply and at low cost.

Figure 2:
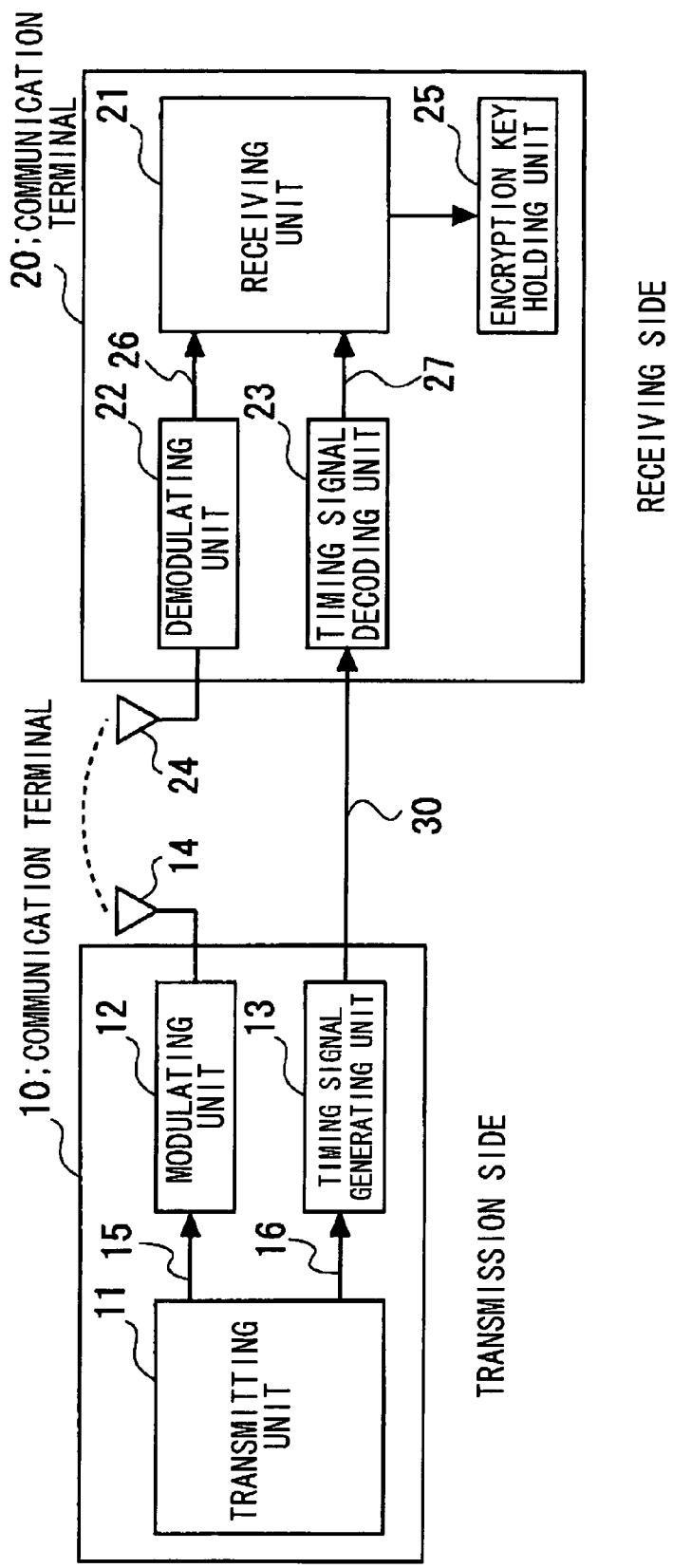
FIG. 2 is a diagram showing a device configuration of an embodiment of the present invention.

FIG. 2 is a diagram showing a system configuration of the embodiment of the present invention. Referring to FIG. 2, the present embodiment includes the communication terminals 10 and 20 that perform communication to each other by wireless. In an example shown in FIG. 2, the communication terminal 10 is assumed to be the terminal on the transmission side of the key information, while the communication terminal 20 is assumed to be the terminal on the receiving side of the key information. The communication terminal 10 includes a transmitting unit 11 for outputting transmission data 15, a modulating unit 12 for modulating the transmission data 15 from the transmitting unit 11 and transmitting an RF (Radio Frequency) signal through an antenna 14 by wireless, and a timing signal generating unit 13 for receiving a control signal 16 from the transmitting unit 11 and outputting a timing signal to a cable 30. The communication terminal 20 on the receiving side includes a demodulating unit 22 for demodulating the signal received through an antenna 24 and outputting demodulated data 26, a timing signal decoding unit 23 for receiving the timing signal from the cable 30 and detecting a transition from the inactive state to the active state or a transition from the active state to the inactive state, and a receiving unit 21 for receiving the demodulated data 26 from the demodulating unit 22 and a decoded signal 27 (a signal indicating a result of decoding of the timing signal) from the timing signal decoding unit 23, determining validity of a received encryption key based on the decoded signal 27, and storing the encryption key determined to be valid in an encryption key holding unit 25.

The cable 30 is one cable connected between the communication terminals 10 and 20 when the encryption key is delivered from the communication terminal 10 on the transmitting side to the communication terminal 20 on the receiving side by wireless. That is, the cable 30 is not connected except when the encryption key is delivered from the communication terminal 10 to the communication terminal 20 by wireless.

Referring to FIG. 2, in the communication terminal 10 on the transmitting side of the key information, a pair of a public key and a private key is generated at an encryption circuit not shown, and the private key is held in the communication terminal 10. The public key is delivered from the communication terminal 10 to the communication terminal 20 by wireless. At this point, the communication terminal 10 sets the potential of the cable 30 to be active. The communication terminal 20 receives the public key transmitted from the communication terminal 10 by wireless, determines the owner of the received public key (communication terminal 10) is the authentic owner because the public key was transmitted in a period during which the potential of the cable 30 is active, and holds the public key. That is, the one cable 30 substitutes for the function of the certificate authority. The arrangement described above constitutes one of the main features of the present invention. Then, the communication terminal 20 uses the held public key to transmit to the communication terminal 10 a common key and cipher text obtained by encrypting plaintext by the common key. The communication terminal 10 decodes the received common key by the private key held in the communication terminal 10, and decodes the cipher text using the common key. Thereafter, transmission and reception of cipher text are made between the communication terminals 10 and 20 using the common key.

Figure 3:
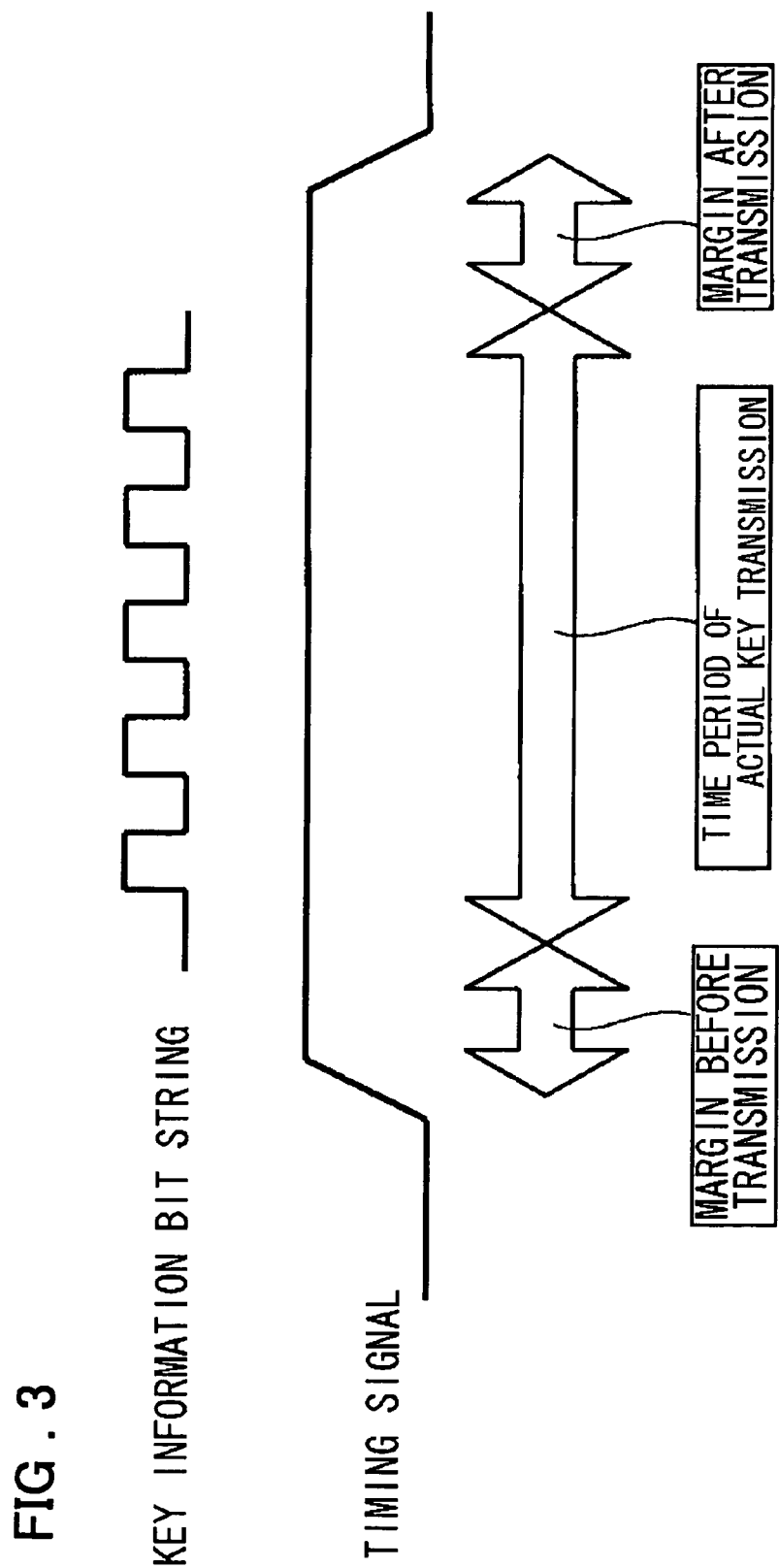
FIG. 3 is a diagram for explaining a timing operation of the embodiment of the present invention.

FIG. 3 is a diagram for explaining an operation of the embodiment of the present invention. Referring to FIG. 3, during a time segment including a period during which a serial bit string (digital baseband signal) of the encryption key (key information) is transmitted by wireless, the timing signal (indicating the potential of the cable 30) is held to be active (such as a logic one). Upon receipt of the control signal 16 from the transmitting unit 11, the timing signal generating unit 13 sets the timing signal to be active. For the timing signal, a time segment (referred to as a "margin before transmission") from when the transmitting unit 11 outputs the encryption key to the modulating unit 12 to when the encryption key is actually transmitted by wireless is secured. That is, the timing signal is set to be active earlier than actual wireless transmission (radio wave propagation) of the encryption key by a transmission side margin. Further, the timing signal is set to be active for a predetermined time (also referred to as a "margin after the transmission") even after the wireless transmission (radio wave propagation) of the encryption key has finished.

The timing signal decoding unit 23 of the communication terminal 20 detects a transition of the timing signal from the inactive state to the active state and a transition of the timing signal from the active state of the timing signal to the inactive state. Based on the decoded signal 27 (including timing information on the start and the end of the wireless transmission) from the timing signal decoding unit 23, the receiving unit 21 of the communication terminal 20 determines the received encryption key to be valid when the period from the starting point of reception of the received encryption key to the end of the reception is included in the activated period of the timing signal, and stores the received encryption key in the encryption key holding unit 25. When the receiving unit 21 receives the encryption key in the period other than the activated period of the timing signal, the receiving unit 21 determines the received encryption key to be an unauthorized key. Thus, the receiving unit 21 does not store the received encryption key in the encryption key holding unit 25, and discards the received key. Alternatively, the receiving unit 21 may output an alarm signal indicating transmission of the unauthorized encryption key and may display this alarm signal on a display or may perform voice output of this alarm signal. Incidentally, the potential of the cable 30 is set to be inactive (pulled down to a ground potential, for example) during the period other than the one in which the encryption key is delivered. When the cable 30 is not connected (in an open state), the input to the timing signal decoding unit 23 is set to a fixed potential.

Figure 4:
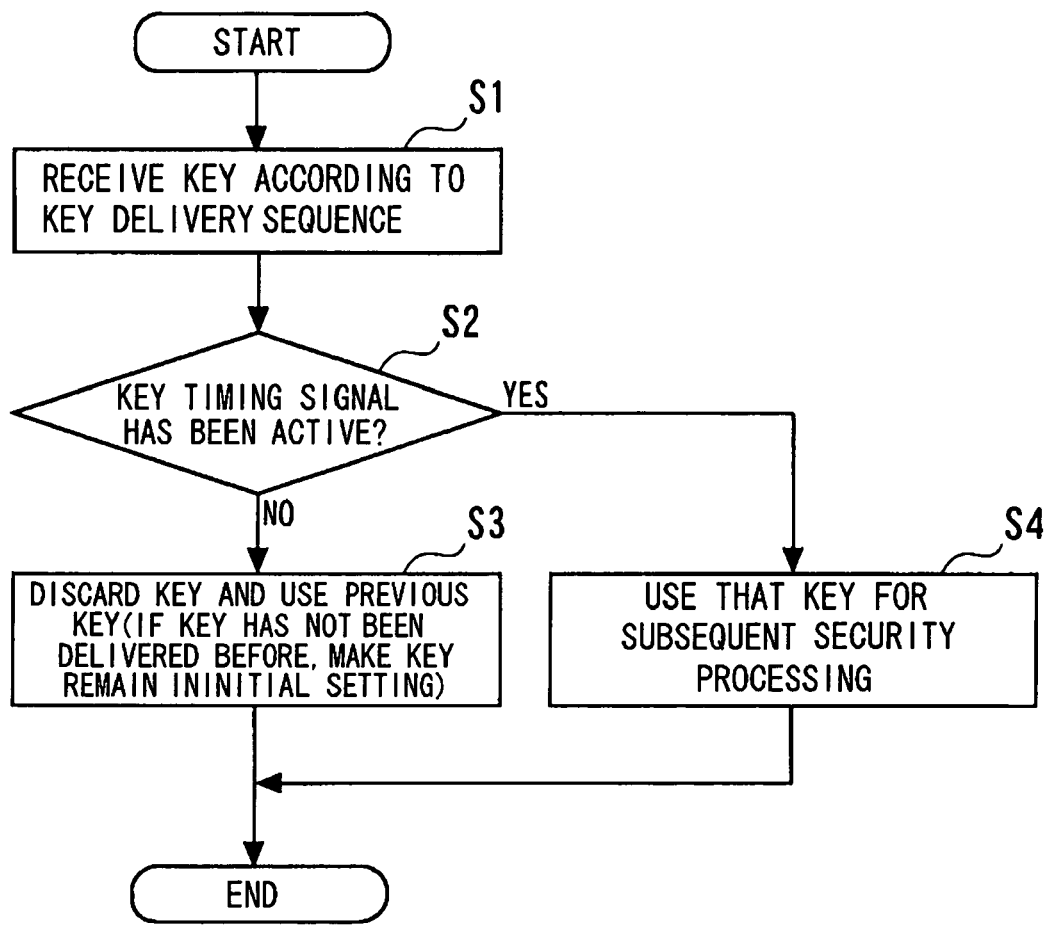
FIG. 4 is a flow diagram for explaining an operation of a device on a receiving side according to the embodiment of the present invention.

FIG. 4 is a flow diagram for explaining an operation of the embodiment of the present invention. When the communication terminal 20 receives the encryption key according to the delivery sequence of the encryption key at step S1, the communication terminal 20 determines whether the timing signal has been activated or not at step S2. When the timing signal has been in an active state (branching to YES at step S2), the received encryption key is used in subsequent security processing at step S4.

When the timing signal has not been in an active state (branching to NO at step S2), the communication terminal 20 discards received encryption key, and uses an encryption key delivered before and stored in the encryption key holding unit 25. At this point, when the encryption key has not been delivered before, the encryption key is made to remain in an initial state thereof. Incidentally, if it has been found as a result of the determination at step S2 that the number of keys delivered while the timing signal is not active has exceeded a predetermined threshold value, the communication terminal 20 may be of course determine that the communication terminal 20 is being attacked and may be configured to output an alarm or the like.

FIGS. 1 and 2 show a communication system constituted from two communication terminals of the communication terminals 10 and 20. The present invention, however, is not limited to this configuration. When the key information (such as the public key) is transmitted from the communication terminal 10 to a plurality of communication terminals, for example, the communication terminal 10 is connected to each of the plurality of communication terminals through a cable one by one, so that point-to-point delivery of the key information is performed. Alternatively, parallel connection from the communication terminal 10 to a plurality of communication terminals using a plurality of cables may be performed.

In the present embodiment, delivery of the public key is performed once at the time of initialization such as the time of installing a product (the communication terminal 10 or 20). Alternatively, the delivery is performed at the time of changing the key information. Thus, a user will not be bothered by this work.

Further, as a cable/connector, a simple configuration such as a mini-plug/mini-jack or a pin plug/pin jack for an sound input, for example, is employed.

Incidentally, when the connector such as a wired USB is provided for the communication terminal, the timing signal may be of course transmitted using the existent wired interface.

As shown in FIG. 2, in the embodiment described above, a description was given to a case in which the communication terminal 10 and the communication terminal 20 are connected by the detachable cable 30. As a variation of the embodiment described above, the input terminal of the timing signal decoding unit 23 in FIG. 2 in the communication terminal 20 may be connected to a selector switch (not shown) for performing switching between a supply potential and the ground potential instead of using the cable 30, for example. Then, while the key information is transmitted from the communication terminal 10 by wireless, the selector switch may be set to the supply potential, and after completion of the wireless transmission of the key information, the selector switch may be switched to the ground potential. Then, switching control over the selector switch may be manually performed by the user. In this case, the selector switch (not shown) for performing switching between the supply potential and the ground potential may be provided for the communication terminal 10 as well. Then, when the selector switch is set to the supply potential, the key information may be transmitted to the communication terminal 20. Synchronous control over the respective selector switches of the communication terminals 10 and 20 (switching control for performing simultaneous switching between the supply potential and the ground potential) may be performed manually by users who operate the communication terminals 10 and 20.

The present embodiment is effective for wireless transmission of arbitrary information targeted for unauthorized access such as a spoofing attack, falsification as well as delivery of the public key.

The foregoing description of the present invention was given in connection with the embodiment described above. The present invention, however, is not limited to the configuration of the embodiment described above, and of course includes various variations and modifications that could be made by those skilled in the art within the scope of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A communication system comprising at least two communication devices for performing wireless communication,
   wherein one communication device of said two communication devices comprises a circuit for performing control so that a signal indicating that predetermined information is valid is transmitted to an other communication device when the predetermined information is transmitted from said one communication device to said other communication device by wireless,
   wherein said other communication device comprises a circuit for determining whether received information is valid based on the signal indicating that the information is valid upon receipt of the information transmitted from said one communication device by wireless, and
   wherein a potential of a medium that transmits said signal is set to an inactive state except while an encryption key is delivered by wireless.

2. The communication system according to claim 1, wherein said one communication device transmits the signal indicating that the information is valid to said other communication device in a form of an electric signal.

3. The communication system according to claim 1, wherein the signal indicating that the information is valid is set to be active during a time range including a period during which information sent from said one communication device by wireless is transmitted to said other communication device.

4. The communication system according to claim 1, wherein said one communication device further comprises a circuit for generating a timing signal as the signal indicating that the information is valid and transmitting the timing signal to said other communication device, the timing signal being for making discrimination between a timing of starting the transmission of the information by wireless and a timing of finishing the transmission of the information by wireless.

5. The communication system according to claim 4, wherein said other communication device further comprises:
   a receiving circuit for receiving the information transmitted by wireless from said one communication device; and
   a circuit for receiving the timing signal transmitted from said one communication device,
   wherein said receiving circuit determines whether the information transmitted by wireless from said one communication device is valid according to whether said receiving circuit has received the information transmitted or not by wireless from said one communication device at a time between a timing of starting the transmission and a timing of finishing the transmission indicated by the received timing signal.

6. The communication system according to claim 5, wherein said other communication device determines that said other communication device is being attacked when a number of receiving the information at a time other than a period defined by the timing of starting the transmission and the timing of finishing the transmission indicated by the timing signal has exceeded a predetermined threshold value.

7. The communication system according to claim 6, wherein said other communication device outputs an alarm signal when determining that said other communication device is being attacked.

8. The communication system according to claim 1, wherein the signal indicating that the information is valid is transmitted from said one communication device to said other communication device through a cable detachably connecting one terminal of said one communication device and one terminal of said other communication device.

9. The communication system according to claim 1, wherein the predetermined information includes the encryption key.

10. A communication system comprising:
    at least two communication devices for performing communication by wireless; and
    a cable for establishing connection between a predetermined terminal of one communication device of said two communication devices and a predetermined terminal of an other communication device of said two communication devices,
    wherein said one communication device comprises a circuit for performing control so that a potential of said cable is set to an active state from an inactive state when transmitting an encryption key to said other communication device by wireless and a potential of said cable is set to an inactive state after a completion of the wireless transmission of said encryption key, and
    wherein said other communication device comprises a circuit for determining said encryption key received from said one communication device within a period during which the potential of said cable is in the active state to be a valid encryption key, and storing said encryption key in a storage unit of said other communication device.

11. A method of performing wireless communication between at least two communication devices, said method comprising:
    transmitting by one communication device of said two communication devices a signal indicating that predetermined information is valid to an other communication device when transmitting the predetermined information from said one communication device to said other communication device by wireless; and
    determining whether received information is valid based on a signal indicating that the information is valid upon receipt of the information transmitted from said one communication device by wireless, by said other communication device,
    wherein a potential of a medium that transmits said signal is set to an inactive state except while an encryption key is delivered by wireless.

12. The method according to claim 11, wherein the signal indicating that the information is valid is transmitted from said one communication device to said other communication device in a form of an electric signal.

13. The method according to claim 11, wherein the signal indicating that the information is valid is set to be active during a time range including a period during which the information sent from said one communication device by wireless is transmitted to said other communication device.

14. The method according to claim 11, wherein said one communication device generates a timing signal as the signal indicating that the information is valid, and transmits the timing signal to said other communication device, the timing signal being for making discrimination between a timing of starting the transmission of the information by wireless and a timing of finishing the transmission of the information by wireless.

15. The method according to claim 14, wherein said other communication device determines whether the information transmitted from said one communication device by wireless is valid according to whether said other communication device has received the information transmitted by wireless from said one communication device at a time between a timing of starting the transmission and a timing of finishing the transmission indicated by the timing signal.

16. The method according to claim 15, wherein said other communication device determines that said other communication device is being attacked when a number of receiving the information at a time other than a period defined by the timing of starting the transmission and the timing of finishing the transmission indicated by the timing signal has exceeded a predetermined threshold value.

17. The method according to claim 16, wherein said other communication device outputs an alarm signal when determining that said other communication device is being attacked.

18. The method according to claim 11, wherein the signal indicating that the information is valid is transmitted from said one communication device to said other communication device through a cable detachably connecting one terminal of said one communication device and one terminal of said other communication device.

19. The method according to claim 11, wherein the predetermined information includes the encryption key.

20. A communication method comprising:
    establishing connection between one communication device and an other communication device by a cable;
    setting a potential of said cable to an active state from an inactive state when transmitting an encryption key to said other communication device by wireless, and setting the potential of said cable to an inactive state after completion of the wireless transmission of said encryption key, by said one communication device; and determining said encryption key received from said one communication device within a period during which the potential of said cable is in the active state to be a valid encryption key, and storing said encryption key in a storage unit of said other communication device, by said other communication device.

21. The communication method according to claim 20, wherein the potential of said cable is set to the inactive state except while said encryption key is delivered.

22. A communication device comprising:

an antenna;

a control terminal connected to a control terminal of a device of a communication party through an electrical connecting member;

a circuit for delivering an encryption key by wireless to said device of said communication party through said antenna; and a circuit for setting a potential at said control terminal to an active state while delivering said encryption key to said device of said communication party by wireless and then setting the potential at said control terminal to an inactive state after delivering said encryption key to said device of said communication party by wireless.

23. A communication device comprising:

an antenna;

a control terminal for receiving a control signal;

a circuit for decoding an encryption key transmitted from a device of a communication party by wireless and received through said antenna; and a circuit for determining whether said received encryption key has been received in a period during which the potential at said control terminal is an active state and performing control so that said received encryption key is stored in a holding circuit thereof as a valid encryption key when said encryption key is determined to have been received in a period during which the potential at said control terminal is in the active state.

* * * * *